INVENTORS
JOHN BRETZ, JR.
LEE W. PARRISH
BY
Knox & Knox

INVENTORS
JOHN BRETZ, JR.
LEE W. PARRISH
BY

Knox & Knox

United States Patent Office 2,821,985
Patented Feb. 4, 1958

2,821,985

SEED HARVESTING COMBINE HAVING RECLEANER

John Bretz, Jr., and Lee W. Parrish, Yuma, Ariz.

Application November 4, 1955, Serial No. 544,880

2 Claims. (Cl. 130—27)

The present invention relates generally to seed harvesting devices and more particularly to a seed harvesting combine having a seed recleaner.

The primary object of this invention is to provide a seed harvesting combine having a secondary cleaning action, making the machine particularly well adapted for harvesting seed crops where the seeds are very small and light in weight. The conventional harvesters are quite unsatisfactory for this purpose since such small seeds are discarded along with weed seeds. In fact, ordinary combine recleaners tend to save the useless elements and to "throw over" the small seeds of alfalfa, Bermuda grass and Ladino clover.

Another object, ancillary to the primary object is to provide a combine operating on a new principle in combine harvesting machines, namely, the direct or initial discard of only that portion of the material extracted by the straw walkers, the remaining portion of the chaff being re-circulated and reduced to fine particles which literally flow away from the seeds, thus preventing throw over of seeds.

Another object of this invention is to provide a seed harvesting combine in which a secondary cleaner is mounted on the grain tank so as to reclean the seed immediately before delivery to the tank.

Another object of this invention is to provide a seed harvesting combine in which a secondary cleaner allows an adjustment of the primary cleaning means so that no appreciable good seed is thrown over, since considerably more chaff and the like can be tolerated in the seed delivered by the primary cleaner because this chaff will be later removed by the secondary cleaner.

Another object of this invention is to provide a seed harvesting combine having means to prevent the cleaned seed from being carried away by wind passing over the seed tank.

Similar characters of reference indicate similar or identical elements and portions throughout the specification and throughout the views of the drawing.

Finally, it is an object to provide a device which is simple, safe and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1:
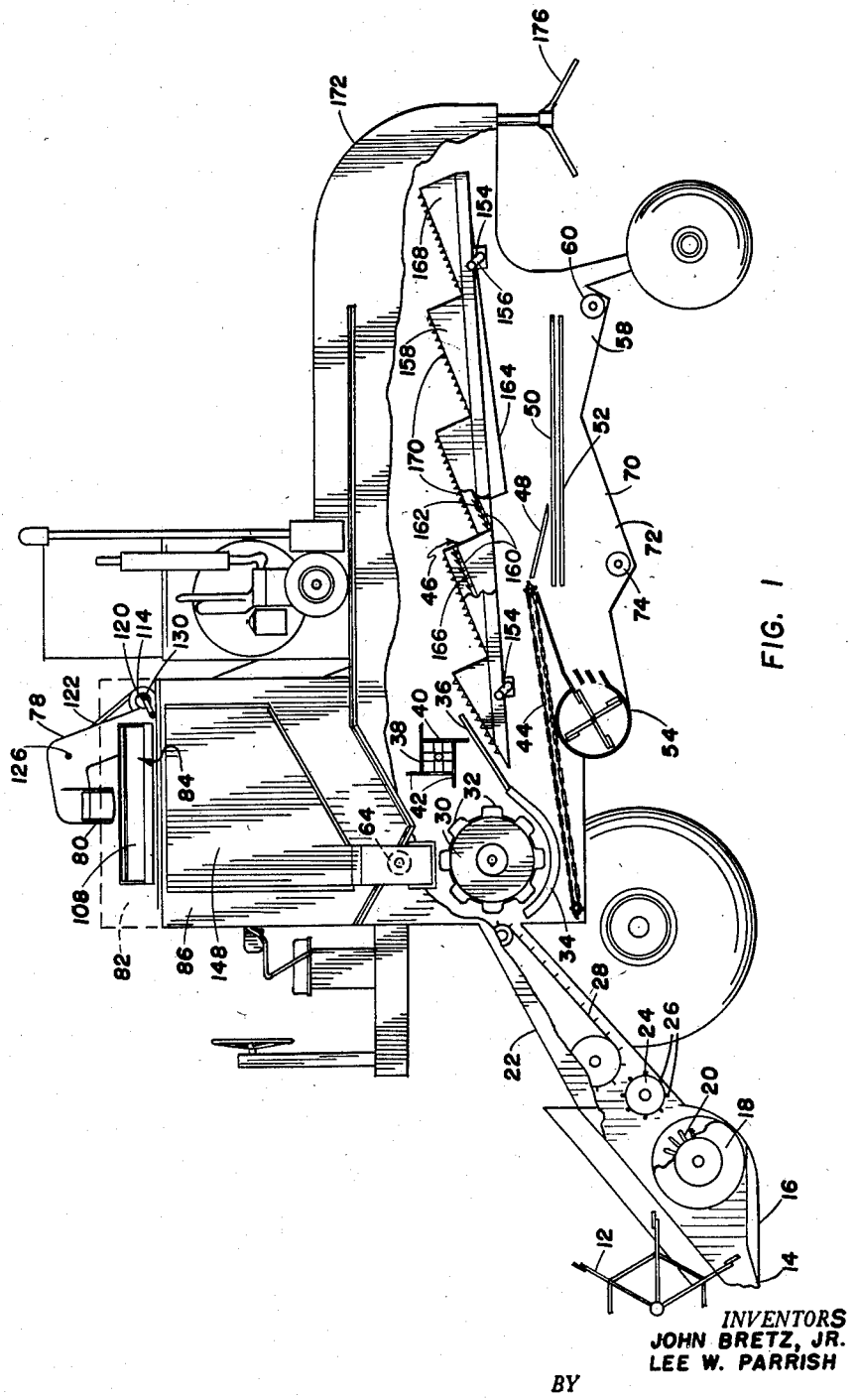
Figure 1 is a somewhat diagrammatic left side view of a combine according to this invention, a portion of the side being broken away to disclose internal structure.
Figure 2:
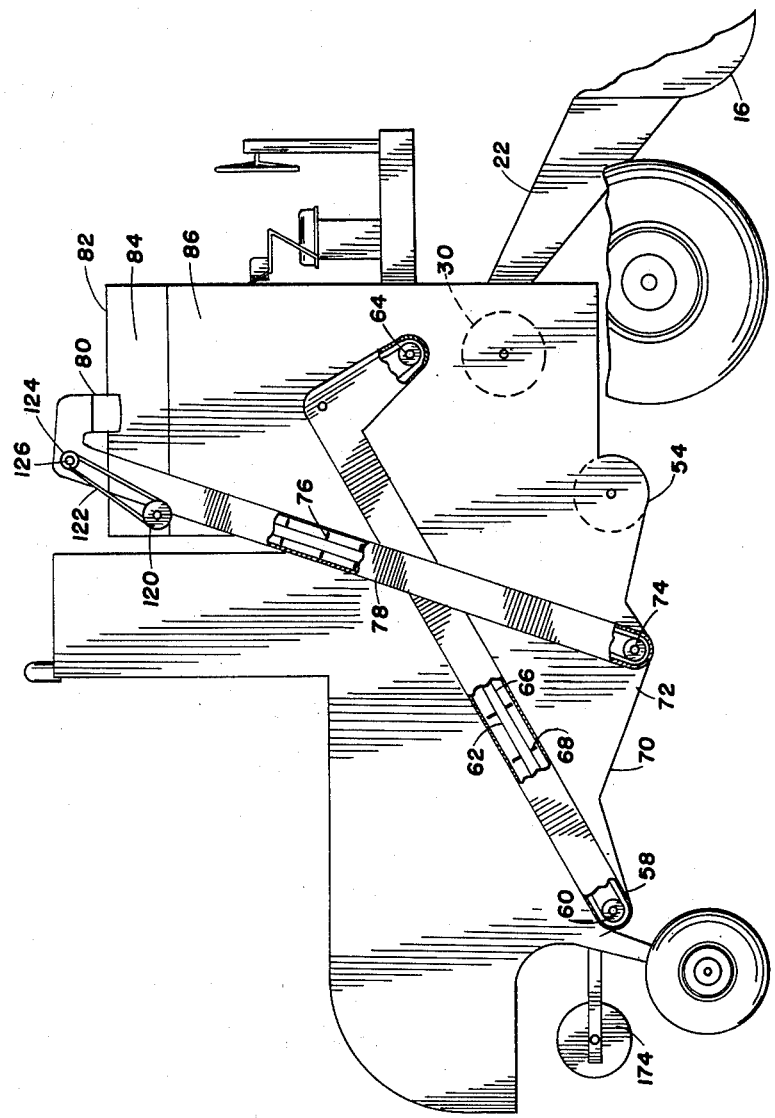
Figure 2 is a somewhat diagrammatic right side view of the combine illustrated in Fig. 1, portions of the side and portions of the elevator housings being broken away for a clearer showing of internal parts.

In the harvesting of seed, growers have experienced considerable difficulty in obtaining clean seed without a relatively high percentage of loss of seed.

In order to obtain a yield of very clean grain or seed in the combines now available, the primary cleaning unit must necessarily be maintained at a relatively high angle, while a relatively strong blast of air is passed through and over the unit. This results in a great loss, the seed being carried away with the chaff, thereby reducing the yield, especially where the seeds are very small and light.

Heretofore, recleaning has been done for the producers in large recleaning plants, the producer being charged by the hundredweight for the recleaning process. It will be obvious that delivery of relatively clean seed to the recleaning plant results in a considerable reduction in cost to the producer and that this reduction in cost is accompanied by an increase in the percentage recovery of the crop. There is another saving in cost also, since the cost of hauling the material removed by the recleaner is also avoided.

The instant invention provides a harvesting combine having secondary seed cleaning means in the form of a recleaner operatively mounted thereon, and acting simultaneously with the primary cleaning means, resulting in a relatively clean crop for delivery to the recleaning plant, if necessary, or to a buyer.

Since most of the parts of a conventional grain harvesting combine can be used in our seed harvesting combine, the well known parts not changed by our invention are shown quite diagrammatically and no claim to the same, per se, is made. Our invention does embrace the combination of these old parts with a recleaner and re-circulating means and cooperates therewith to produce a new result. For this reason these old parts and their functional relationship are disclosed. It is also noteworthy that many of said old parts are so adjusted and changed as to constitute means for a new process and new concept in combine construction.

Our seed harvesting combine is, therefore, diagrammatically illustrated as having a power driven reel 12, of a type heretofore used in grain combines, which brings standing stalks against the cutter bar 14, or a windrow pickup may be used, the material being carried to the center of the platform 16, by means of a horizontally mounted continuous, two-way auger 18. Retracting fingers 20 on the barrel of the auger 18 move the stalks rearwardly into the feeder housing 22. A cylindrical feeder beater 24 mounted transversely at the forward end of the housing 22, is provided with extended fingers 26 to move the grain to a feeder conveyor chain 28. The chain 28 is undershot to move the grain stalks rearwardly on the floor of the feeder housing 22 to a threshing cylinder 30. The cylinder 30 is provided with spaced longitudinal rasps 32 of channel-like shape, which rasps 32 initiate the separation of the seed from the stalks when the stalks pass between the rotating threshing cylinder 30 and a concave grate 34 slightly below the cylinder 30.

The grate is provided with rearwardly extending guide fingers to guide the stalks against a feeder-beater 38. The beater 38 is of square cross-section, each side 40 of the beater being extended beyond the adjacent side. The wings 42, thus formed thresh the crop stalks against the guide fingers 36, deflecting the seed between the fingers 36 to the chain conveyor 44. The stalks, and the portion of the seed not released by the rasps 32 and the threshing action of the beater 38, are carried rearwardly by the beater 38 to a straw walker 46, the operation of which is described briefly hereinafter.

The seed and small chaff on the conveyor 44 is carried rearwardly and is deposited on an auxiliary chaffer 48 extending downwardly and rearwardly from the rearward end of the conveyor 44, the auxiliary chaffer 48 aiding in removing the seed from heads which have escaped the threshing action of the cylinder 30 and the feeder-beater 38, and allowing the loose seed and chaff to fall on the chaffer 50. Seed separated from the chaff and heads by the action of the straw walker 46 also falls on the chaffer 50. The chaffer extends rearwardly from a point slightly under the conveyor 44, and at a very light downward angle. The chaffer 50 and a sieve 52 mounted immediately therebelow are connected and comprise what is known as the cleaning shoe which is constantly agitated or reciprocated to move the chaff rearwardly and further separates seed from the chaff.

A comparatively low capacity fan 54 is mounted below the conveyor 44 and forward of the chaffer 50 and sieve 52 to direct a very moderate draft of air through the sieve 52 and the chaffer 50, thereby urging a limited quantity of dirt and small particles of chaff which has not passed through the adjustable lips of the sieve 52 toward a tailings bin 58.

The new concept in combine harvesting of seed crops is dramatically evident at this point. Heretofore, the cleaning shoe has been rather sharply inclined in actual practice and a strong blast of air has always been directed onto the cleaning shoe. However, in the instant seed harvesting combine the cleaning shoe is maintained substantially horizontal at all times and the air blast is reduced approximately 95%. In grain harvesting combines the fan creates an air blast which blows the chaff forcibly over the chaffer for immediate discard onto the ground, but in our machine very little chaff is thus directly discarded on the first leg of its travel through the machine. In the instant machine, as will become more clearly evident hereinafter, most of the chaff is reduced to finely divided particles or dust by recirculation through the machine and this dust literally floats off in a relatively gentle air drift through the open bottom of the hood 172 at the rear of the machine, leaving the seeds. This new concept of the process carried out by the machine should be kept in mind as an aid in appreciating the following portion of this specification.

These heavier particles of chaff and dirt, along with a considerable quantity of good seed, are carried to the rearward end of the sieve 52 and are deposited in a tailings bin 58. A tailings auger 60 moves the tailings longitudinally of the bin to a laterally mounted tailings elevator 62 extending upwardly and forwardly of the combine to a cross auger 64 positioned directly above the cylinder 30. The cross auger 64 deposits the tailings on the cylinder 30, to be re-threshed.

The relatively clean seed passing through the chaffer 50 and the sieve 52 falls onto a seed pan 70. The pan 70 extends downwardly and forwardly from the upper edge of the tailings bin 58, and directs the cleaned seed into a cleaned grain bin 72. A clean seed auger 74 moves the seed longitudinally of the bin 72 to a clean seed elevator 76 mounted on the side of the combine, in the housing 78, carries the seed from the grain bin 72 to a chute 80 which extends through an opening in a wind hood 82 and directs the seed onto a recleaner 84.

Figure 3:
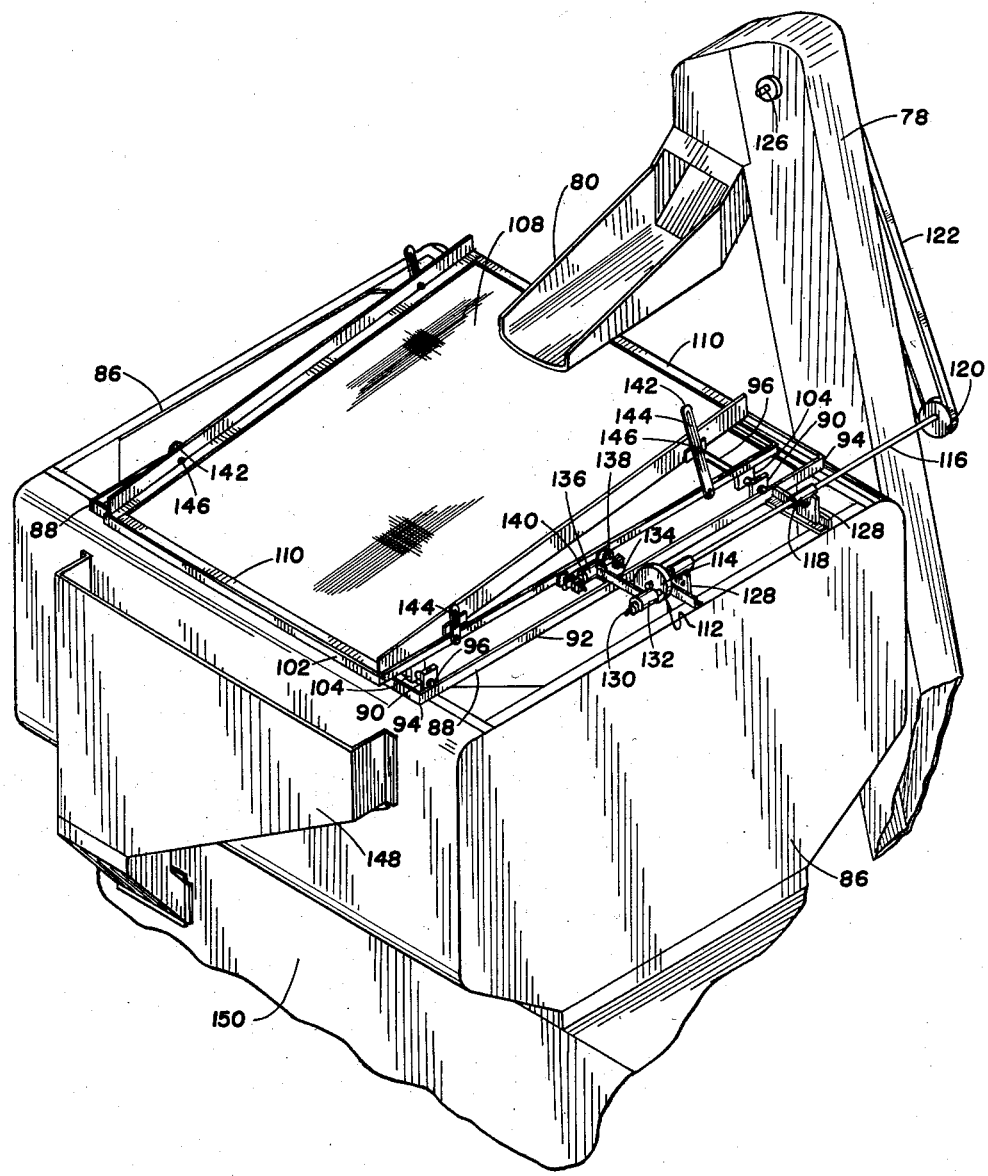
Figure 3 is a fragmentary, perspective view, on an enlarged scale, of the upper portion of the combine, including the grain storage tank, and showing the novel recleaner and grain return chute.
Figure 4:
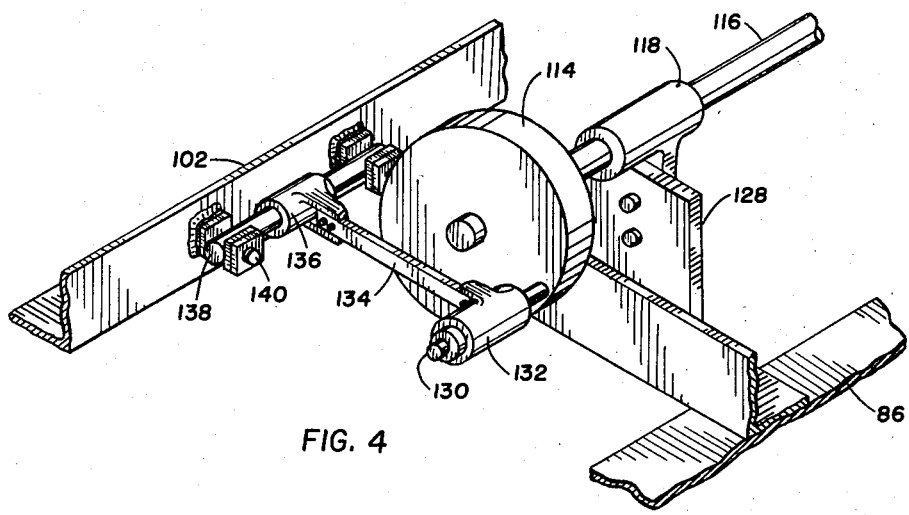
Figure 4 is a fragmentary perspective view, on an enlarged scale, of the shaker mechanism of the recleaner.
Figure 5:
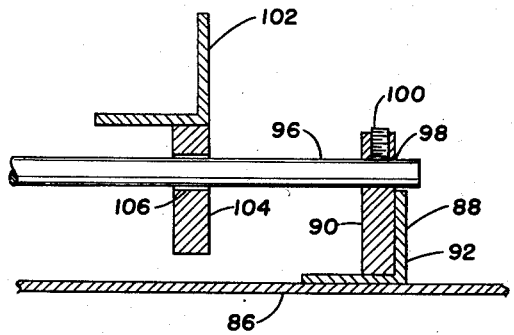
Figure 5 is a fragmentary sectional view, on an enlarged scale, of a portion of the recleaner, showing the means of mounting the shuttle frame on the recleaner frame.

The secondary seed recleaning means or recleaner is illustrated in detail in Figures 3, 4 and 5 and is mounted on the top of the seed storage tank 86 and comprises a rectangular frame 88 of angle-iron or the like rigidly attached transversely of the top of the tank 86. Lugs 90 are affixed to the sides 92 of the frame 88 a short distance from the corners 94 and extend above the frame 88 to allow shuttle rods 96 to extend through bores 98 therein. The lugs are also provided with set screws 100 to hold the shuttle rods 96 against movement relative to the frame 88. A shuttle frame 102, similar to the frame 88, is provided with downwardly extending lugs 104 having bores 106 to receive the shuttle rods 96.

A screen 108 having a frame 110 is tiltably mounted on the shuttle frame 102 in a position to receive seed from the chute 80. A reciprocal motion of the shuttle frame 102 and the screen 108 is obtained by means of a shaker 112 comprising a disc 114 supported in bearings 118.

The disc 114 is spaced slightly from the center of the rearward side of the shuttle frame 102, and the shaft 116 extends parallel to the frame 102 and the frame 88 to a point slightly outwardly of the clean seed elevator 76 and a pulley 120 is mounted thereon. A belt 122 extending between the pulley 120 and another pulley 124 on the end of the upper shaft 126 of the clean seed elevator 76 drives the disc 114.

The bearings 118 are mounted on brackets 128 supported on and extending between the edge of the tank 86 and the frame 88. A crank pin 130 is rigidly fixed on the disc 114 a short distance from the axis thereof. A bearing 132 is mounted on the pin 130, and is engaged with one end of a connecting rod 134, the other end of the rod 134 being engaged with a shuttle bearing 136 similar to the crank bearing 132. The shaft 138 is journalled in the shuttle bearing 136 and is secured to the shuttle frame in parallel, slightly spaced relation by means of bolts 140.

The screen 108 is held in tilted position by means of adjusting arms 142, one end of which is pivotally secured to the frame 88 and the other end extending upwardly. Slots 144 in the arms 142 provide means to adjust the angle of the screen frame 110 since bolts 146 extending through the slots 144 and attached to the frame 110 may be loosened slightly and moved to a new position in the slots 144, thereby raising or lowering either end of the screen 108.

The screen 108 will normally be tilted downwardly from the chute 80. The reciprocal action of the screen 108 is in a direction transverse to the flow of grain from the chute 80, thereby distributing the grain evenly over the screen, and avoiding the problem of clogging. The recleaned seed drops through the screen 108 into the tank 86, while the residual chaff, dirt, and unthreshed heads are directed toward a return chute 148 by the tilted attitude and reciprocal motion of the screen 108.

The reject chute 148 is defined in part by one wall of the seed storage tank 86 and delivers the reject material from the screen 108 through an opening in the side plate 150 of the combine directly onto the threshing cylinder 30. This invention envisages no material change in the seed bin or straw walker assembly construction which may be of any of the well known types. For purposes of completing the disclosure herein of one complete combine, we have illustrated a conventional straw walker 46 having parallel step units, only one of which is illustrated in Figure 1. Then units are mounted on angularly offset throws 156 of two parallel transverse crank shafts 154 to provide the well known straw walker action. Each step 158 is tilted and includes serrated sides 168 and serrated step bottoms 160. The step bottoms follow the slope of the serrated sides 168 and are provided with openings 162 through which seeds may pass. A seed return pan 164 attached to the under side of each unit 152, receives the seed passing through the openings 162 and directs the seed onto the auxiliary chaffer 48. The forwardly positioned crankshaft 154 may be belt driven from the engine 11 and rotates clockwise as viewed from the right side of the combine. This rotation, aided by raised portions 166 in the step bottoms 160, and serrations 168 in the sloping edges 170 of each step 158, moves the chaff rearwardly. The straw walker 46 extends rearwardly from a point slightly below the guide fingers 36 to a point within the hood 172, and moves the straw rearwardly to gravitate from the end of the walker 46 through the open bottom of the hood 172. A chopper 174 and/or a spreader 176 may be used to further treat the straw and spread it as a mulch on the field being harvested.

In recapitulation, this invention has to do with the incorporation in an otherwise conventional combine, of means to reclean the seed, at least once, by means of a recleaner located at the top of the combine and means for re-circulation of the uncleaned seed to the threshing cylinder as often as necessary. It will also now be clear that the usual blast of air is eliminated and in its place we have only a gentle draft of air to float the chaff (other than that rejected by the straw walkers) over a cleaning shoe disposed horizontally and operating at maximum efficiency, the chaff being reduced to fine particles by the constant re-circulation and re-threshing so that its particles are lighter than the small seeds being recovered. It has been found that this machine can be operated even on windy days since wind hood 82 avoids loss of seed after recovery has been completed.

It is understood that minor variation from the form of the invention disclosed herein may be made without departure from the spirit and scope of the invention, and that the specification and drawing are to be considered as merely illustrative rather than limiting.

We claim:

1. In a seed harvesting combine: threshing means including a threshing cylinder; straw removing means; primary seed cleaning means including an agitated chaffer and sieve means, and fan means to produce a gentle draft of air over said chaffer and sieve means; collecting means to collect the seed which gravitates through the seed cleaning means; a tailings bin at one edge of said sieve means; means to return the tailings to the threshing means for rethreshing a recleaner constituting secondary seed cleaning means to reclean the collected seed as well as the re-threshed tailings and comprising a frame, a shuttle frame mounted on said frame for horizontal motion, means to reciprocate said shuttle frame, a screen mounted on said shuttle frame and tiltable about an axis adjacent one edge of the shuttle frame, means to hold the screen in adjusted tilted position, and a wind shield enclosing said screen, said screen and said motion being horizontal and parallel to said axis so that the screening is accomplished under draft-free conditions and solely by agitation and gravity; said recleaner being disposed substantially vertically above said threshing cylinder and having a reject chute leading directly to said threshing cylinder so that unthreshed heads and other reject material are returned by gravity directly to said threshing cylinder; and a seed tank to receive the recleaned seed; said fan means being such as to produce a draft of air insufficient to carry the chaff and whereby the chaff, other than that ejected by said straw removing means, is re-threshed and finely divided into particles which float away from said sieve means for discard out of the combine.

2. A combine according to claim 1 and wherein said screen of the recleaner is mounted immediately above said seed tank, said reject chute being defined in part by said seed tank, so that said recleaner is adapted for easy incorporation with combines of contemporary form.

References Cited in the file of this patent

UNITED STATES PATENTS

| 887,632 | Haynes | May 12, 1908 |
| 1,761,346 | Jelbart | June 3, 1930 |
| 1,835,327 | Paradise | Dec. 8, 1931 |
| 2,306,753 | Ronning | Dec. 29, 1942 |
| 2,409,292 | MacGregor | Oct. 15, 1946 |
| 2,617,425 | Dion | Nov. 11, 1952 |

FOREIGN PATENTS

| 319,566 | Great Britain | Sept. 26, 1929 |